UNITED STATES PATENT OFFICE.

ALBERT DOMEIER AND OTTO CHRISTIAN HAGEMANN, OF LONDON, ENGLAND, ASSIGNORS TO SAID ALBERT DOMEIER AND JOSEPH GLATZ, OF BROOKLYN, NEW YORK.

PROCESS OF RECOVERING GLYCERINE FROM SOAP-LYES.

SPECIFICATION forming part of Letters Patent No. 371,127, dated October 4, 1887.

Application filed March 18, 1887. Serial No. 231,357. (No specimens.)

*To all whom it may concern:*

Be it known that we, ALBERT DOMEIER and OTTO CHRISTIAN HAGEMANN, residents of London, England, have invented an Improved Process for Treating Soap-Lyes for the Purpose of Obtaining Glycerine and other Products Therefrom; and we do hereby declare that the following is a full, complete, and exact description of said process.

The objects of this invention are, first, to obtain glycerine and other useful products from soap-lyes, and, second, to remove impurities from the glycerine.

In carrying out our invention we proceed as follows: The spent lyes are collected in a suitable tank, whereupon there is added to them a small proportion of caustic lime, baryta, alumina, or any earthy or metallic oxide or hydrate capable of combining with the soapy and fatty matters that are contained in the lye. In ordinary cases it will suffice to add about two pounds of the lime to about one hundred gallons of the lye. The lime, or its above-mentioned equivalents, produces an insoluble precipitate, which quickly settles to the bottom of the tank in which the operation is performed, and thus the lye is purified from a large proportion of the fatty matters it contained. We next boil the lye down to the "salting-point"—that is to say, we concentrate it until it is saturated with salt. This eliminates a considerable quantity of the water, reduces the bulk of the lye, and brings it into the best condition for subsequent treatment. We now draw off the lye into another tank and mix with it an insoluble silicate—such as silicate of alumina (kaolin) or silicate of magnesia, glass-flour, or finely-divided silica—the mixing being by preference effected while blowing air through the lye. A good proportion is the addition of about one and one-half pound of kaolin to sixty gallons of lye. We now add an excess of hydrochloric or other acid, and continue the blowing of air for some time after the acid has been added, allowing the resultant precipitate to settle, whereupon we draw off the clear lye. By an excess of hydrochloric acid we mean such a quantity of acid as will show from one to one and one-half per cent. of free acid to the original bulk of the lye. The exact quantity to be added depends, necessarily, upon the fatty and resinous matter contained in the lye. By the addition of the acid the fatty and resinous constituents of the lye are rendered insoluble, and, being liberated from the solution in the presence of the finely-divided kaolin, combine mechanically with the same, forming a heavy precipitate, which quickly subsides, leaving the lye clear and bright.

It will be seen from the above statement that the object of the kaolin or its equivalent is, to an extent, of a mechanical character—namely, to mechanically combine with the insoluble resinous matter, causing the same to fall to the bottom of the lye. Any matter that will perform this function is by us regarded as equivalent to the kaolin, and we find, among others, that instead of kaolin a small proportion of light petroleum or other oil may be used. In this case the petroleum rises to the surface of the lye and brings with it the separated fatty and resinous acids, which can be conveniently skimmed off. It requires, however, considerable agitation to render this process available, and even then the separation is not as good and clear as by the kaolin method. We now add to the lye soda, either caustic or carbonate of soda, the same being added in such proportion as to render the liquor faintly alkaline; and we heat the lye to about 80° centigrade and allow the resulting precipitate to settle, drawing off the clear lye. The object of adding the soda is to purify the lye from albuminous matters, which coagulate and fall to the bottom. Instead of soda, any other suitable alkali may be added to the lye. Finally, we boil the lye to about 150° centigrade, thereby evaporating more water, causing the salt which is carried in the lye to crystallize. This salt may be washed and used over again in the manufacture of soap. The lye, purified from soapy and fatty matters by the first operation—namely, the addition of lime—from fatty acids and resinous acids by the third operation—namely, the addition of acid and kaolin—and from albuminous matters by the fourth operation—namely, the addition of soda—is thus by the final evaporating process concentrated, so as to eliminate the remainder of the water and most of the salt, giving us as a final product crude glycerine, which is fit for distillation without any other treatment.

In many instances the first operation—namely, that of adding lime—is not essential, as the third operation—namely, the addition of acid and kaolin—will also suffice by itself to eliminate the fatty and soapy matter; but this requires more acid and renders the process more expensive. If the spent lye is at once treated with the hydrochloric acid and kaolin without previous treatment with lime, it must nearly always be done in a thin state—that is, before it is boiled down to salting-point. This in most cases is necessary on account of the difficulty experienced in boiling down a soapy lye, from its tendency to froth and boil over. By adding the lime this difficulty is overcome, and the second process of boiling down is rendered practicable; yet of course by omitting the first and second processes and starting on the spent lye with the hydrochloric acid and kaolin we arrive at the same result, but at greater expense and less convenience.

As to the third process—to wit, that of adding kaolin and an excess of hydrochloric acid—we may state that, although other suitable acid may be used, hydrochloric is by far the best, because it produces chloride of sodium, (common salt,) which, when recovered, can be used over again indefinitely in the manufacture of soap.

As to the fourth operation—namely, purifying the lye from albuminous matters—it is necessary to have the lye neutral in order to get the best result, and accordingly it is neutralized with carbonate or caustic soda, or other alkali, which, in conjunction with the hydrochloric acid used in operation No. 3, helps form chloride of sodium.

We will here recapitulate in brief our process of treating lye for the purpose of obtaining its valuable constituents. This process involves the addition, first, of lime; second, boiling it down to the salting-point; third, mixing it with kaolin and hydrochloric acid; fourth, mixing it with soda, and, fifth, concentrating it until the salt is crystallized and the glycerine formed. Out of this lye we have removed, first, by the addition of lime, certain of its fatty constituents; second, by the boiling, a certain quantity of its water; third, by the acid and kaolin, its resinous and fatty acids; fourth, by the addition of soda, its albuminous constituents, and fifth, by the final concentration, the salt.

We claim as our invention—

1. The process herein described of recovering glycerine from lye, which consists in adding thereto, while air is blown through the lye, an excess of acid in the presence of an insoluble silicate, substantially as and for the purpose described.

2. The process of recovering glycerine from lye, which consists in adding to it an acid in the presence of a current of air and of an insoluble powder to serve as a mechanical carrier of the resulting precipitate, said precipitate being the insoluble resinous and fatty acids that were originally contained in the lye.

3. The process of preparing lye for the extraction of glycerine, which consists in adding thereto an excess of acid in the presence of a mechanical carrier in the nature of an insoluble powder of the resulting precipitate, and afterward adding an alkali to said lye for the purpose of removing the albuminous matters therein contained, as specified.

4. The process herein described of extracting salt from lye, which consists in adding thereto acids in the presence of an insoluble powder constituting a mechanical carrier of the resulting precipitate, and afterward adding an alkali to the lye and then boiling it down until the salt it contains crystallizes and glycerine is separated, as set forth.

5. The process of extracting salt and glycerine from lye, which consists in first adding lime; second, boiling the lye down to the salting-point; third, adding acid in the presence of an insoluble powder constituting a mechanical carrier of the resulting precipitate, then adding alkali, and finally boiling the lye down until the salt crystallizes and glycerine is separated, as set forth.

6. The process of recovering salt and glycerine from spent lye, which consists in adding lime, then acid in the presence of a mechanical carrier of the nature of an insoluble powder of the resulting precipitate, then soda, and finally boiling down the lye until the salt it contains crystallizes and glycerine is separated, as set forth.

In testimony whereof we have signed our names to this specification, in the presence of the subscribing witnesses, at London, this 28th day of February, 1887.

ALBERT DOMEIER.
OTTO CHRISTIAN HAGEMANN.

Witnesses:
  HENRY G. FREEMAN,
  J. MAY,
    *Both of 9 Birchin Lane, London.*